(12) United States Patent
Birk et al.

(10) Patent No.: US 11,162,548 B2
(45) Date of Patent: Nov. 2, 2021

(54) CONTROL DEVICE AND METHOD FOR OPERATING A DUAL-CLUTCH TRANSMISSION OF A MOTOR VEHICLE

(71) Applicant: AUDI AG, Ingolstadt (DE)

(72) Inventors: Andreas Birk, Nuremberg (DE); Mathias Weinhardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 721 days.

(21) Appl. No.: 16/071,288

(22) PCT Filed: Feb. 9, 2017

(86) PCT No.: PCT/EP2017/052906
§ 371 (c)(1),
(2) Date: Jul. 19, 2018

(87) PCT Pub. No.: WO2017/140576
PCT Pub. Date: Aug. 24, 2017

(65) Prior Publication Data
US 2021/0199162 A1 Jul. 1, 2021

(30) Foreign Application Priority Data
Feb. 15, 2016 (DE) ...................... 10 2016 202 286.5

(51) Int. Cl.
*F16H 61/04* (2006.01)
*F16D 48/06* (2006.01)

(52) U.S. Cl.
CPC ....... *F16D 48/062* (2013.01); *F16H 61/0403* (2013.01); *F16D 2500/1026* (2013.01);
(Continued)

(58) Field of Classification Search
CPC ......... F16D 48/062; F16D 2500/30806; F16D 2500/50684; F16D 2500/70454;
(Continued)

(56) References Cited

U.S. PATENT DOCUMENTS

2004/0224818 A1* 11/2004 Leising ................ B60W 10/06
2008/0026910 A1    1/2008 Honma et al.
(Continued)

FOREIGN PATENT DOCUMENTS

DE    10 2005 035 885 A1    2/2007
DE    10 2007 032 078 A1    2/2008
(Continued)

OTHER PUBLICATIONS

International Preliminary Report on Patentability dated Aug. 30, 2018 in corresponding International Application No. PCT/EP2017/052906; 7 pages.
(Continued)

*Primary Examiner* — Justin Holmes
(74) *Attorney, Agent, or Firm* — Maier & Maier, PLLC

(57) ABSTRACT

A method for operating a dual-clutch transmission of a motor vehicle, wherein a first clutch is operated closed or engaged and in this way a first transmission branch is driven, in which a current actual gear is engaged, and in a pre-selection phase for a gear changed to a desired gear in a second transmission branch, the desired gear is engaged, and in a second clutch, a clutch hydraulic system is filled and, in this way, the second clutch is closed. The gear change shall be made faster. The filling of the clutch hydraulic system is begun already during the pre-selection phase, and, in this case, the clutch hydraulic system is filled in the pre-selection phase but at most up to reaching a touch point of the second clutch.

18 Claims, 3 Drawing Sheets

(52) U.S. Cl.
CPC .............. *F16D 2500/10412* (2013.01); *F16D 2500/3067* (2013.01); *F16D 2500/30806* (2013.01); *F16D 2500/5035* (2013.01); *F16D 2500/50684* (2013.01); *F16D 2500/70406* (2013.01); *F16D 2500/70454* (2013.01); *F16H 2061/0407* (2013.01)

(58) Field of Classification Search
CPC ... F16D 2500/3067; F16D 2500/70406; F16D 2500/1026; F16D 2500/10412; F16D 2500/5035; F16H 61/0403; F16H 2061/0407
See application file for complete search history.

(56) References Cited

U.S. PATENT DOCUMENTS

| | | | |
|---|---|---|---|
| 2010/0279818 A1* | 11/2010 | Soliman ................ | B60W 10/06 477/5 |
| 2012/0298466 A1* | 11/2012 | Nedachi ................. | F16D 48/06 192/84.6 |
| 2014/0224613 A1 | 8/2014 | Versteyhe et al. | |
| 2015/0233474 A1* | 8/2015 | De Visscher ....... | F16H 61/0437 192/3.61 |

FOREIGN PATENT DOCUMENTS

| | | |
|---|---|---|
| DE | 10 2006 042 393 A1 | 3/2008 |
| DE | 10 2008 043 384 A1 | 5/2010 |
| DE | 10 2009 059 081 A1 | 7/2010 |
| DE | 10 2010 018 532 B3 | 7/2011 |
| DE | 10 2010 011 917 A1 | 9/2011 |
| DE | 197 51 456 B4 | 9/2013 |
| EP | 1 898 113 A2 | 3/2008 |
| GN | 102235495 A | 11/2011 |
| GN | 105190075 A | 12/2015 |
| WO | 2005/008103 A1 | 1/2005 |

OTHER PUBLICATIONS

Chinese Office Action dated May 31, 2019, in connection with corresponding CN Application No. 201780011133.0 (18 pgs., including machine-generated English translation).

Examination Report dated Apr. 13, 2016 of corresponding German application No. 10 2016 202 286.5; 7 pgs.

International Search Report and Written Opinion of the International Search Authority dated Apr. 26, 2017 of corresponding International application No. PCT/EP2017/052906; 16 pgs.

* cited by examiner

CONTROL DEVICE AND METHOD FOR OPERATING A DUAL-CLUTCH TRANSMISSION OF A MOTOR VEHICLE

BACKGROUND

The invention relates to a method for operating a dual-clutch transmission of a motor vehicle. Thanks to the method, the so-called pre-selection phase for a gear change and the closing or engaging of one of the clutches are coordinated. In the pre-selection phase, the desired gear to be engaged is synchronized, unlocked, and finally engaged. By the closing of the clutch, the desired gear engaged is coupled to a crank shaft of the engine. The invention also concerns a control device for the dual-clutch transmission as well as a motor vehicle with the dual-clutch transmission.

An especially close coordinating of a pre-selection phase with the closing of a clutch is known from DE 197 51 456 B4. For this, however, the clutch by way of which the new gear being engaged, that is, the desired gear, is coupled to the crank shaft of the engine, is previously operated constantly partly filled. In other words, although this clutch is operated opened or disengaged, its clutch hydraulic system remains partly filled and is therefore never drained as far as a stop setting. This is not possible in many types of transmission, since the draining of an unused, disengaged clutch to its stop setting is necessary in order to prevent wear on the clutch hydraulic system and the clutch.

In order to shorten the shifting phase from a current actual gear to a desired gear, it is known from DE 10 2009 059 081 A1 how to fill the clutch hydraulic system abruptly and therefore more quickly, without this resulting in an overshooting of the desired pressure value being established.

Another description of a dual-clutch transmission is known from DE 10 2008 043 384 A1. Technical terms used in the present case are borrowed from this publication, such as touch point, point of engagement (kiss point).

SUMMARY

The object of the invention is based on mastering a gear change from a current actual gear to a desired gear within a short changeover time in a dual-clutch transmission.

The object is achieved by the subject matter of the independent patent claims. Advantageous enhancements of the invention are given by the features of the dependent patent claims.

A method is provided for the operating of a dual-clutch transmission of a motor vehicle. During the driving of the motor vehicle, a torque of a crank shaft of an engine is transmitted across the dual-clutch transmission to a transmission output of the dual-clutch transmission, from which it can then be further conveyed to the wheels of the motor vehicle. In this case, the method according to the invention provides that a first clutch is operated closed or engaged by means of a filled first clutch hydraulic system, and in this way a first transmission branch is driven, in which a current actual gear is engaged or set. Said clutch hydraulic system comprises in particular a slave cylinder, which is filled and whose piston thus holds the clutch closed by releasing the piston.

Meanwhile, a second clutch of the dual-clutch transmission is operated opened by means of a second clutch hydraulic system drained to a stop setting. Thus, the clutches in the dual-clutch transmission are self-opening, in that the respective clutch is opened when the clutch hydraulic system is drained.

Now, for a gear change to a new desired gear, a pre-selection phase occurs. In the pre-selection phase, in a second transmission branch a rotational motion of the desired gear is synchronized with the transmission output and then the synchronized desired gear is unlocked and then engaged. Thus, thanks to the synchronizing of the rotational motion, gear wheels of the desired gear are accelerated or braked in their rotational motion so that they are running synchronously with a gear wheel which is already rotating with the transmission output. The desired gear is unlocked upon synchronous rotational motion, so that it can ultimately be engaged. The unlocking enables further movement of the desired gear, so that the gear wheel of the desired gear can engage with the gear wheel coupled to the transmission output. This further movement of the gear wheel is then the actual engaging of the gear.

A second aspect of the gear change is the closing or engaging of the second clutch. For this, in the cased of the second clutch, the second clutch hydraulic system is filled and in this way the second clutch is filled up to a touch point starting from which the second clutch transmits a torque from the crank shaft to the second transmission branch. The filling proceeds beyond this, until the clutch is closed. Said touch point is the touch point or kiss point or biting point known from the prior art.

Now, in order to speed up the change to the desired gear, i.e., to make possible a faster closing of the second clutch with the desired gear engaged, it is provided according to the invention that the filling of the second clutch hydraulic system is begun already during the pre-selection phase, and the second clutch hydraulic system is filled in the pre-selection phase, but at most up to reaching the touch point of the second clutch. In other words, the second clutch is already partly moved up to the touch point from its open position, without disturbing the pre-selection phase by the transmitting of a torque, i.e., the synchronizing, unlocking, and engaging of the desired gear. The second clutch may thus be operated up to the pre-selection phase with the second clutch hydraulic system drained as far as the stop setting, and thus in a gentle or wear-free way. Only at the gear change is the second clutch hydraulic system filled, and this occurs so early that, starting from when the desired gear is engaged, the second clutch is already closed to such an extent that it can transmit a torque via the second transmission branch with the desired gear from the touch point onward, with no delay.

The invention may also include optional enhancements whose features result in additional advantages.

According to one enhancement, the second clutch hydraulic system is filled with a hydraulic fluid up to more than 60 percent, especially more than 70 percent, of a final volume at which the clutch is fully closed already during the pre-selection phase. This makes it possible, after the pre-selection phase, to complete the changeover from the current actual gear to the desired gear with little hydraulic fluid, namely, with the remaining volume. Thus, it is possible to fill more than 60 percent, especially more than 70 percent of the required hydraulic fluid for the closing of the second clutch already in the second clutch hydraulic system, without this interfering with or adversely affecting the pre-selection phase.

One enhancement provides that the second clutch hydraulic system is filled in stages with at least one interim stage in which a desired filling pressure of the second clutch hydraulic system is constant. In other words, the filling is not a continuous, homogeneous filling process. Instead, by providing at least one interim phase, the filling of the second clutch hydraulic system is attuned to the individual stages of the pre-selection phase, namely, the synchronizing, unlocking and engaging. In this way, consideration is made for the fact that the second clutch should not be closed up to the touch point from start, at the very beginning of the pre-selection phase, for otherwise the described wear effects when carrying out the pre-selection phase with second clutch already closed up to the touch point will also result, as is the case in the prior art.

Once the pre-selection phase has been concluded and the second clutch is closed up to the touch point, the actual transition from the current actual gear to the desired gear may occur, that is, a blending (superimposing) or transition between the first clutch and the second clutch. One enhancement of the invention provides for this, that after the pre-selection phase, the first clutch is opened by at least partial draining of the first clutch hydraulic system, and at the same time, the second clutch is closed by further filling of the second clutch hydraulic system beyond the touch point, such that the torque of the engine transmitted to the clutch output is constant. Thus, in this way a change from the current actual gear to the desired gear occurs, without any change in torque on the wheels, so that, in particular, persons inside the motor vehicle do not feel any jerking in the drive of the motor vehicle. This also improves the travel safety, since the wheels cannot lose their adhesion to the roadway surface by a sudden change in the driving torque.

One particular benefit may be achieved if the desired gear is lower than the current actual gear. This is known as down shifting. Hence, one shifts from a gear n to a gear n–1. One enhancement of the invention provides that already during the pre-selection phase a rotational speed of the crank shaft of the engine, that is, a rotational speed of the engine itself, is increased by partial draining of the first clutch hydraulic system. This then produces a partial opening of the first clutch, whereby the torque generated by the engine on the crank shaft is no longer transmitted exclusively to the clutch output, so that the differential torque accelerates the engine, that is, increases the rotational speed. This produces the benefit that, upon closing the second clutch, the synchronous speed is already closer to that of the new desired gear, and thus the engine does not need to be accelerated via the second clutch by way of closing it.

One enhancement for this solves the problem that the rotational speed of the engine is increased by partial opening of the first clutch, and in this way, it may have a rotational speed that is too high, beyond the synchronous speed. In order to prevent this, one enhancement provides that, after the pre-selection phase, an overshooting of the rotational speed is damped or prevented by further filling of the second clutch hydraulic system. In other words, the first clutch is partly opened during the pre-selection phase, so that the engine is accelerated, and then the revving or accelerating of the engine by means of the second clutch through partial closing of same by means of the second clutch hydraulic system is damped or braked, so that the engine is then arrested at a predetermined rotational speed.

One enhancement concerns the special case when the dual-clutch transmission is supposed to shift, not by one gear stage, but by two gear stages. This enhancement proposes that shifting is done by a dual shifting from the current actual gear to a target gear that differs by two gear stages and, in this case, the desired gear previously in question is an intermediate gear, to which the shift is first made from the current actual gear by means of the second clutch. After the closing of the second clutch, with the intermediate gear active, i.e., while the intermediate gear is being used to transmit the torque from the engine to the transmission output, as a new desired gear, the target gear in a further pre-selection phase is synchronized, unlocked and engaged in the first clutch branch. During the further pre-selection phase, the first clutch hydraulic system is filled, but only as far as a touch point of the first clutch. In other words, therefore, the filling for the first clutch in the pre-selection phase is therefore performed precisely at the same time as the pre-selection phase as has already been described in connection with the second clutch. Due to the close intermeshing of the shifting events during the dual shifting, a constant engine torque is made possible at the synchronous rotational speed of the target gear. In other words, the engine can be operated to put out the same torque throughout, and in this way shifting takes place by two gear stages.

One enhancement for this purpose provides an additional shortening of the time for the dual shifting in that the first clutch hydraulic system remains constantly at least partly filled during the dual shifting. In other words, after engaging the intermediate gear and thus after the disengaging of the original current active gear, the first clutch hydraulic system is not entirely drained, but instead continues to operate partly filled, yet below the touch point, until it is then filled once more up to the touch point during the further pre-selection phase in order to engage or set the target gear.

As already mentioned, the method according to the invention can be implemented by a control device for a dual-clutch transmission of a motor vehicle. The invention therefore provides such a control device that is designed to control electrohydraulic actuators for the filling and draining of a respective clutch hydraulic system of a first clutch and a second clutch of the dual-clutch transmission according to one embodiment of the method according to the invention. The electrohydraulic actuators, in particular, set a hydraulic master cylinder for a hydraulic fluid, which then acts on a slave cylinder of the clutch hydraulic system. For example, an electric motor can be provided as the electrohydraulic actuator, which moves the piston of the master cylinder by way of a worm gearing. Corresponding electrohydraulic actuators are known in themselves from the prior art.

Finally, the invention also relates to the actual motor vehicle having a dual-clutch transmission, wherein the dual-clutch transmission has an embodiment of the control device according to the invention. The motor vehicle according to the invention is designed as an automobile, especially a passenger car or a truck.

BRIEF DESCRIPTION OF THE DRAWINGS

In the following, an exemplary embodiment of the invention shall be described. Shown herein for this purpose.

DETAILED DESCRIPTION

The exemplary embodiment explained in the following is a preferred embodiment of the invention. In the exemplary embodiment, the components described for the embodiment each constitute individual features of the invention to be considered independently of one another, which also enhance the invention independently of one another, and thus should also be deemed to be part of the invention individually or in another combination than the one shown. Furthermore, the described embodiment may also be supplemented by others of the already described features of the invention.

In the figures, elements of the same function are given the same reference numbers.

Figure 1:
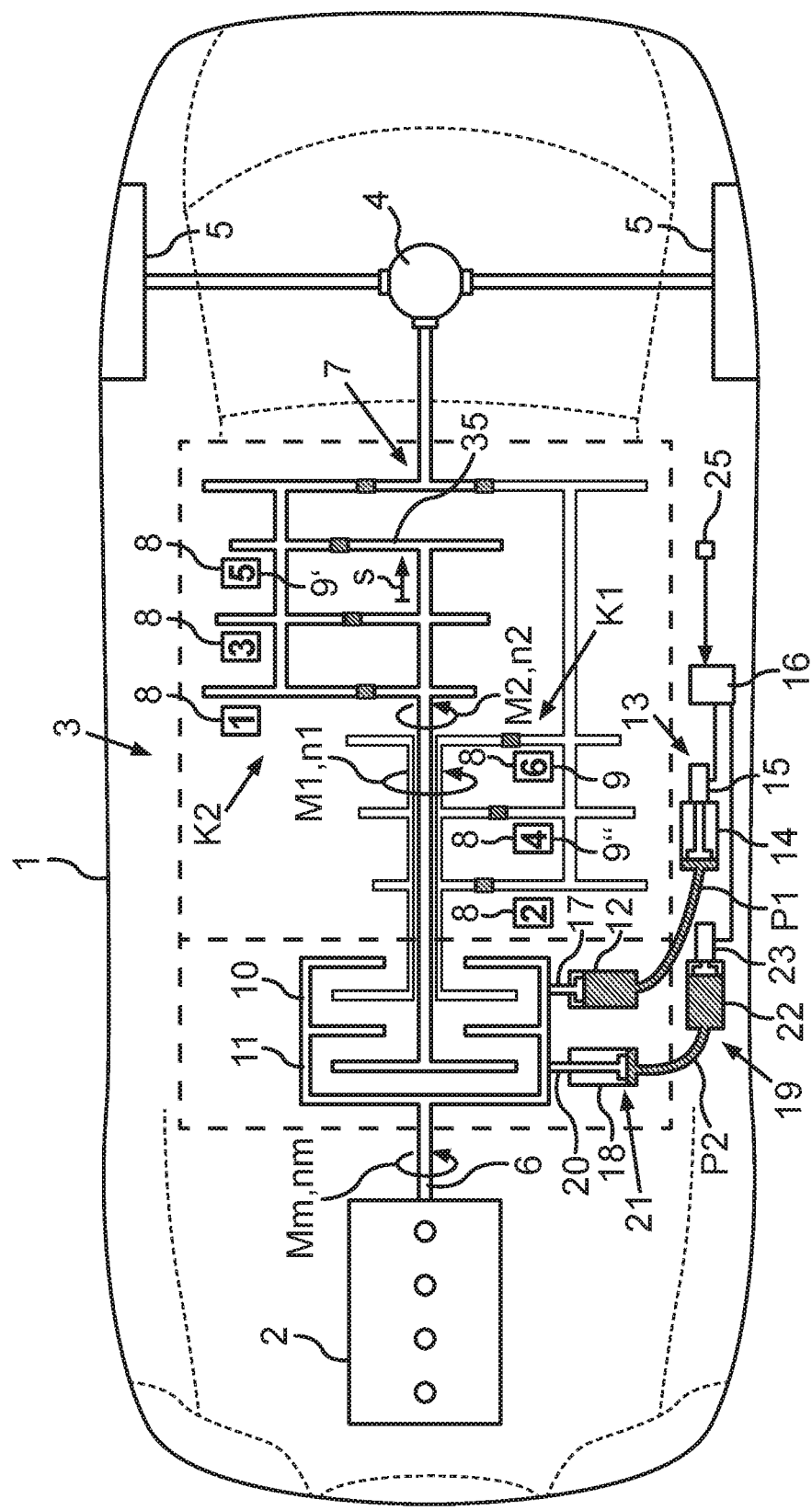
FIG. 1 a schematic representation of one embodiment of the motor vehicle according to the invention.

FIG. 1 shows a motor vehicle 1, which may be an automobile, for example, particularly a passenger car. It shows an internal combustion engine, or simply engine 2, a dual-clutch transmission 3, a differential 4, and driving wheels 5. During travel of the motor vehicle 1, the engine 2 generates, on a crank shaft 6, a driving torque or engine torque Mm, which is transmitted via the crank shaft 6 to the dual-clutch transmission 3 and from here it is provided, after undergoing a gearing, to a transmission output 7 and transmitted via the differential 4 to the driving wheels 5. In this case, the engine 2 drives the wheels 5 and thus the motor vehicle 1.

The dual-clutch transmission 3 comprises a first transmission branch K1 and a second transmission branch K2. For example, FIG. 1 shows a partitioning of transmission gears or gear stages 8 between the two transmission branches K1, K2. For the further explanation of the exemplary embodiment, it shall be assumed that the gear stage "6" is engaged at the time point represented in FIG. 1, that is, the gear stage "6" represents the current actual gear 9.

The dual-clutch transmission 3 furthermore has a first clutch 10 and a second clutch 11. The first clutch 10 is closed, so that the engine torque Mm is transferred across the first clutch 10 to the first transmission branch K1 and to the current gear 9 and thus the gear stage of the current gear 9 is operative for the gearing of the engine torque Mm to the transmission output 7. Hence, a clutch torque M1 is operating through the first transmission branch K1, which for better visual clarity in FIG. 1 is represented on a hollow shaft of the first transmission branch K1. The crank shaft 6 rotates in this case with a driving speed nm and, accordingly, the first transmission branch K1 rotates with a transmission speed n1. The transmission speed n1 also is represented on the hollow shaft in FIG. 1 merely for better visual clarity.

In the meantime, the second clutch 11 is open. A clutch torque M2 of the second clutch pathway K2 accordingly has an undefined value, because the second transmission branch K2 can rotate freely. A transmission speed of the second clutch transmission K2 is denoted here as n2. The clutch torque M2 and the transmission speed n2 are likewise drawn on the shaft corresponding to the hollow shaft in FIG. 1 merely for better visual clarity.

The closed state of the first clutch 10 is produced by a first clutch hydraulic system 12. The clutch hydraulic system 12, for example, may comprise a slave cylinder. The clutch hydraulic system 12, i.e., the slave cylinder, is filled. This is accomplished by an electrohydraulic actuator 13, which may comprise for example a master cylinder 14 and an electric motor 15. A control device 16 controls the electric motor 15. Thanks to the actuator 13, a hydraulic pressure P1 in the transmission hydraulic system 12 is set to such a value that a disengaging unit or gear selector 17 is entirely disengaged or extended, and in this way the clutch 10 is closed.

The open position of the second clutch 11 is produced by a second clutch hydraulic system 18, which may likewise involve a slave cylinder. An electrohydraulic actuator 19 is operated upon by the control device 16 in such a way that a hydraulic pressure P2 in the second clutch hydraulic system 18 is so low that a disengaging unit or gear selector 20 of the second clutch hydraulic system 18 is retracted as far as a stop setting 21 and, in this way, the second clutch 11 is opened. For this purpose, the actuator 19 may comprise, just like the actuator 13, a master cylinder 22 and an electric motor 23, which in turn may be controlled by the control device 16.

In the following, FIG. 2 and FIG. 3 will be used to illustrate how a gear change can occur in the motor vehicle 1. A gear change may take place by one gear stage from a current actual gear to a desired gear 9', i.e., shifting by a single gear stage, or also a dual shifting 24 by two gear stages to a target gear 9" may occur.

Figure 2:
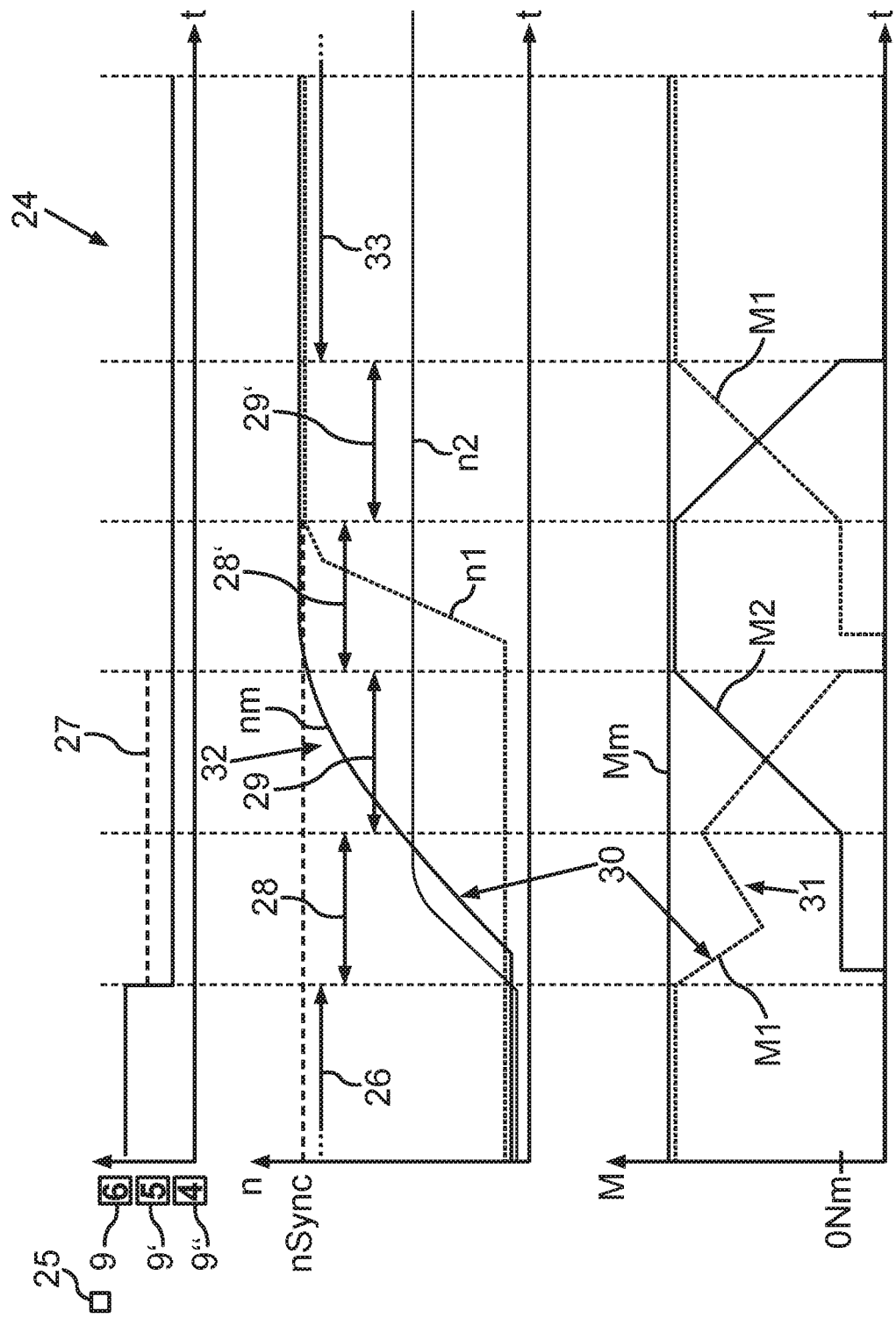
FIG. 2 three diagrams with schematized time curves of operating parameters of a clutch transmission of the motor vehicle of FIG. 1.

FIG. 2 shows for this purpose the curves of a desired gear setting 25, the rotational speeds n and the torques M as functions of time.

During a first travel phase 26 the operating state as described in connection with FIG. 1 prevails. In other words, the current gear 9 is engaged and the engine torque Mm is transferred via the first transmission branch K1 as the transmission torque M1 to the transmission output 7. Then the dual shifting occurs, wherein at first the desired gear 9' is selected as an intermediate gear 27 and only then does the shifting to the target gear 9" occur. For the shifting to the intermediate gear 27, which corresponds to the shifting by a single gear stage, the synchronizing, unlocking and engaging of the desired gear 9' occurs in a pre-selection phase 28. This is further explained below in connection with FIG. 3.

After the end of the pre-selection phase there occurs an overlap phase 29, during which the transmitting of the engine torque Mm from the first clutch 10 to the second clutch 11 is intersected or overlapped. This takes place by appropriate adjusting of the hydraulic pressures P1, P2 in the clutch hydraulic systems 12, 18. After this, the desired gear 9' is active as the new current actual gear and the transfer of the engine torque Mm occurs entirely by way of the second transmission branch K2. There then follows a further pre-selection phase 28', in which the first transmission branch K1 of the target gear 9" is synchronized, unlocked and engaged. A further overlap phase 29' may then occur, in order to overlap from the second clutch 11 to the first clutch 10.

FIG. 2 shows how a partial opening of the first clutch 10 occurs in the pre-selection phase 28 by appropriate adjusting of the hydraulic pressure P1 and how this accomplishes a rotational speed acceleration 30 of the engine 2 and thus of the crank shaft 6, in that the engine produces a constant engine torque Mm, but only a portion of this is transferred across the first transmission branch K1 as the transmission torque M1. In this way, the engine is not accelerated beyond a target rotational speed or synchronous rotational speed nsync, but instead there is at first a damping 31 of the rotational speed acceleration of the engine speed nm by means of the first clutch 10 in the pre-selection phase 28 and then a concluding damping 32 in the overlap phase 29 already by means of the second clutch 11, in that the latter transfers a gradually increasing share of the engine torque Mm as the transmission torque M2.

In the second pre-selection phase 28', the engine 2 already has the synchronous rotational speed nsync and the filling of the clutch hydraulic system 12 for the closing of the first clutch 10 may once more occur directly with the second clutch 11 closed.

In the second overlap phase 29', the second clutch 11 is then opened once more and the first clutch 10 is closed accordingly and, in this way, the engine torque Mm being transferred is gradually overlapped by the second transmission branch K2 on the first transmission branch K1. In the final travel phase 33, the engine torque Mm is then transferred once more by way of the first transmission branch K1, but at the synchronous rotational speed nsync with closed first clutch 10 and opened second clutch 11.

During the respective pre-selection phases 28, 28', each time the respective target clutch, i.e., the second clutch 11 in the pre-selection phase 28 and the first clutch 10 in the pre-selection phase 28', transfers no torque (0 Nm) to the respective transmission branch K2, K1, so as not to impair the synchronizing, unlocking and engaging.

Figure 3:
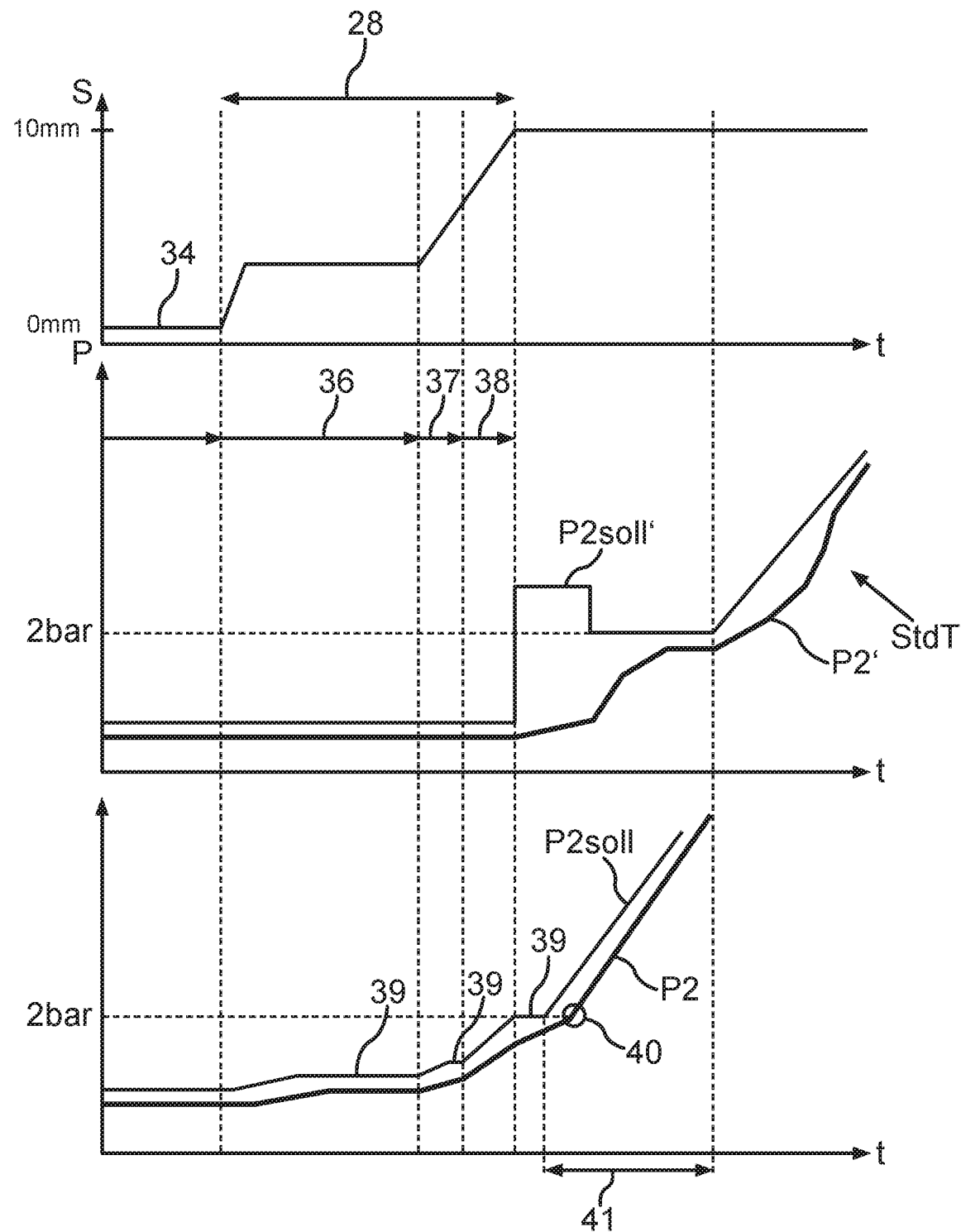
FIG. 3 a diagram with additional schematized time curves of operating parameters of the clutch transmission.

FIG. 3 illustrates how in the pre-selection phase 28 the second clutch 11 is nevertheless closed far enough so that, even though it transfers no torque (0 Nm) to the second transmission branch K2, it is still prepared for the subsequent overlap phase 29, in order to commence the overlap phase 29 with little time delay. The same also applies to the pre-selection phase 28' in regard to the first clutch 10.

FIG. 3 illustrates as a function of time t a travel range s of a gear selector (not shown) of the second transmission branch K2 (also see FIG. 1), the indicated path lengths (10 millimeters) being merely examples. Furthermore, a time function of the hydraulic pressure P2 for the second transmission hydraulic system 18 is shown. As reference, the prior art StdT is illustrated with regard to the second transmission hydraulic system 18, which is represented here as the hydraulic pressure P2'.

Prior to the pre-selection phase 28, the second clutch 11 is entirely open, that is, the second transmission hydraulic system 18 is in the stop setting 21 and thus the second clutch 11 is in an open setting 34, indicated here as the reference path s=0 millimeters. For the synchronizing of the desired gear 9', a corresponding gear wheel 35 is moved by means of the gear selector (see FIG. 1), so that the travel range s is changed. In this way, the transmission rotational speed n2 is synchronized, and a corresponding transmission rotational speed n2 is set at the desired gear 9' by the gearing ratios. After the synchronizing 36, the unlocking 37 can occur, that is, the gear selector can be released so that it can continue to move without causing damage to the gear wheel 35. There then occurs the engaging 38, during which the gear wheel 35 finally enters into a form fit with a corresponding gear wheel.

In the prior art StdT, only after the engaging 38 is there a change in the desired value P2*soll*' of the transmission hydraulic system, in order to close the second clutch 11 in this way.

By contrast, in the motor vehicle 1, a filling of the second transmission hydraulic system 18 occurs by the control device 16 already during the pre-selection phase 28, preferably in several interim stages 39, already during the synchronizing 36, the unlocking 37 and the engaging 38, by setting a corresponding clutch desired pressure P2*soll*, so that the disengaging unit 20 is already moved from its stop setting 21 and in this way the second clutch 11 is partly closed. Care is taken so that the second clutch 11 during the pre-selection phase 28 is closed at most up to a touch point 40, so that during the pre-selection phase 28 the second clutch 11 transfers no torque (0 Nm) from the crank shaft 6 to the second transmission branch K2 in the manner described (see FIG. 2). Immediately after the pre-selection phase 28, the second clutch 11 has already reached the touch point 40. By further closing of the second clutch 11, i.e., by further increasing the hydraulic pressure P2, it is therefore possible to transfer at once a transmission torque M2 greater than 0 by way of the second transmission branch K2 (see FIG. 2). This reduces the shifting time 41 as compared to the prior art StdT, since in the latter case the second clutch 11 must first be closed from the open setting 34 after the pre-selection phase 28, so that a filling of the second clutch hydraulic system 18 up to the touch point is at first required.

Thus, the sequential execution of the individual phases in the prior art StdT may thus take a long time and be perceived in an undesirable way by the driver, especially in the case of shifting modes involving several gear or clutch changes (for example, the described dual shifting 24 for indirect downshifting).

Therefore, in the motor vehicle 1, the states of the pre-selection (synchronizing, unlocking engaging) and the filling of the clutch hydraulic system are performed at the same time, i.e., in parallel, and thus they are coordinated. With the start of the engaging process, the filling of the clutch to an interim level or in the direction of the interim level may already have begun. Depending on the course of the engaging process, the clutch may be filled further in the direction of the target level, that is, up to the touch point 40. The course of the engaging, that is, the individual phases of synchronizing, unlocking and engaging, is taken into account by the interim stage 39, so that the clutch hydraulic system is not filled beyond what is possible for the corresponding phase (synchronizing, unlocking engaging).

The benefit of this functionality is not only a more dynamic organizing of the shifting process to achieve the reduction in shifting time 41, but also to shorten the slip phases during the shifting process and thereby reduce the wear on the clutches 10, 11.

The coordinating of the degree to which the clutch hydraulic system can be filled already during a pre-selection phase, that is, the coordinating of the degree of parallel occurrence, must be made dependent on the specific design of the dual-clutch transmission. It may be possible to fill the clutch hydraulic system already over 60 percent, especially over 70 percent, since oftentimes only then is the touch point reached. Furthermore, in this regard, a corresponding draining of the already prefilled clutch must be implemented, since the engaging process cannot be completed on account of the prefilling. The described parallelization can be implemented for all kinds of shifting (traction upshifting, thrust upshifting, traction downshifting, thrust downshifting, double declutching), in which a filling process follows an engaging process in the prior art.

On the whole, the example shows how individual shifting phases can be made parallel by the invention in a dual-clutch transmission.

The invention claimed is:

1. A method for operating a dual-clutch transmission of a motor vehicle, comprising:
operating a first clutch that is closed or engaged by a filled first clutch hydraulic system and, in this way, a first transmission branch is driven, in which a current actual gear is engaged, so that a torque is transmitted from a crank shaft of an engine to a transmission output,
operating a second clutch that is open or disengaged by a second clutch hydraulic system drained up to a stop setting, and
in a pre-selection phase for a gear change to a desired gear in a second transmission branch, a rotational motion of the desired gear is synchronized with the transmission output, and the synchronized desired gear is unlocked and engaged, and
in the second clutch, the second clutch hydraulic system is filled and, in this way, the second clutch is closed up to a touch point starting from which the second clutch transmits a torque from the crank shaft to the second transmission branch, and beyond, wherein the filling of the second clutch hydraulic system has begun already during the pre-selection phase and the second clutch hydraulic system is filled in the pre-selection phase at most until reaching a touch point of the second clutch.

2. The method as claimed in claim 1, wherein the second clutch hydraulic system is filled with a hydraulic fluid to more than 60 percent of a final volume at which the second clutch is fully closed, during the pre-selection phase.

3. The method as claimed in claim 1, wherein the second clutch hydraulic system is filled in stages with at least one interim stage in which a desired filling pressure (P2*soll*) is constant.

4. The method as claimed in claim 1, wherein after the pre-selection phase, the first clutch is opened by at least partial draining of the first clutch hydraulic system, and at the same time, the second clutch is closed by further filling of the second clutch hydraulic system beyond the touch point, in such a way that the torque (Mm) of the engine transmitted to the clutch output is constant.

5. The method as claimed in claim 1, wherein the desired gear is less than the current actual gear, and already during the pre-selection phase, a rotational speed (nm) of the crank shaft of the engine is increased by partial draining of the first clutch hydraulic system.

6. The method as claimed in claim 5, wherein after the pre-selection phase, an overshooting of the rotational speed (nm) is damped or prevented by further filling of the second clutch hydraulic system.

7. The method as claimed in claim 1, wherein shifting is carried out by a dual shifting from the current actual gear to a target gear which differs by two gear stages, and the desired gear is an intermediate gear, and after the closing of the second clutch, with the intermediate gear active as a new desired gear, the target gear in a further pre-selection phase is synchronized, unlocked and engaged in the first clutch branch, and during the further pre-selection phase, the first clutch hydraulic system is filled, but only as far as a touch point of the first clutch.

8. The method as claimed in claim 7, wherein the first clutch hydraulic system remains constantly at least partly filled during the dual shifting.

9. A control device implementing the method according to claim 1 in order to operate the dual-clutch transmission of the motor vehicle, wherein the control device is configured to control electrohydraulic actuators for filling and draining of the first clutch and the second clutch of the dual-clutch transmission.

10. The method as claimed in claim 2, wherein the second clutch hydraulic system is filled in stages with at least one interim stage in which a desired filling pressure (P2*soll*) is constant.

11. The method as claimed in claim 2, wherein after the pre-selection phase, the first clutch is opened by at least partial draining of the first clutch hydraulic system, and at the same time, the second clutch is closed by further filling of the second clutch hydraulic system beyond the touch point, in such a way that the torque (Mm) of the engine transmitted to the clutch output is constant.

12. The method as claimed in claim 3, wherein after the pre-selection phase, the first clutch is opened by at least partial draining of the first clutch hydraulic system, and at the same time, the second clutch is closed by further filling of the second clutch hydraulic system beyond the touch point, in such a way that the torque (Mm) of the engine transmitted to the clutch output is constant.

13. The method as claimed in claim 2, wherein the desired gear is less than the current actual gear, and already during the pre-selection phase, a rotational speed (nm) of the crank shaft of the engine is increased by partial draining of the first clutch hydraulic system.

14. The method as claimed in claim 3, wherein the desired gear is less than the current actual gear, and already during the pre-selection phase, a rotational speed (nm) of the crank shaft of the engine is increased by partial draining of the first clutch hydraulic system.

15. The method as claimed in claim 4, wherein the desired gear is less than the current actual gear, and already during the pre-selection phase, a rotational speed (nm) of the crank shaft of the engine is increased by partial draining of the first clutch hydraulic system.

16. The method as claimed in claim 2, wherein shifting is carried out by a dual shifting from the current actual gear to a target gear which differs by two gear stages, and the desired gear is an intermediate gear, and after the closing of the second clutch, with the intermediate gear active as a new desired gear, the target gear in a further pre-selection phase is synchronized, unlocked and engaged in the first clutch branch, and during the further pre-selection phase, the first clutch hydraulic system is filled, but only as far as a touch point of the first clutch.

17. The method as claimed in claim 3, wherein shifting is carried out by a dual shifting from the current actual gear to a target gear which differs by two gear stages, and the desired gear is an intermediate gear, and after the closing of the second clutch, with the intermediate gear active as a new desired gear, the target gear in a further pre-selection phase is synchronized, unlocked and engaged in the first clutch branch, and during the further pre-selection phase, the first clutch hydraulic system is filled, but only as far as a touch point of the first clutch.

18. The method as claimed in claim 4, wherein shifting is carried out by a dual shifting from the current actual gear to a target gear which differs by two gear stages, and the desired gear is an intermediate gear, and after the closing of the second clutch, with the intermediate gear active as a new desired gear, the target gear in a further pre-selection phase is synchronized, unlocked and engaged in the first clutch branch, and during the further pre-selection phase, the first clutch hydraulic system is filled, but only as far as a touch point of the first clutch.

* * * * *